United States Patent
Jung et al.

(10) Patent No.: US 10,694,131 B2
(45) Date of Patent: Jun. 23, 2020

(54) COMPARING CIRCUIT AND AN IMAGE SENSOR INCLUDING A CURRENT STABILIZATION CIRCUIT

(71) Applicant: SAMSUNG ELECTRONICS CO., LTD., Suwon-si, Gyeonggi-Do (KR)

(72) Inventors: Yunhwan Jung, Hwaseong-si (KR); Sunyool Kang, Iksan-si (KR); Jaehong Kim, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 56 days.

(21) Appl. No.: 15/910,532

(22) Filed: Mar. 2, 2018

(65) Prior Publication Data

US 2018/0191977 A1    Jul. 5, 2018

Related U.S. Application Data

(63) Continuation-in-part of application No. 15/622,477, filed on Jun. 14, 2017, now abandoned.

(30) Foreign Application Priority Data

Jun. 15, 2016    (KR) .................... 10-2016-0074692

(51) Int. Cl.
*H04N 5/378*    (2011.01)
*H04N 5/369*    (2011.01)
*H04N 5/357*    (2011.01)
*H04N 5/3745*    (2011.01)
*H04N 5/376*    (2011.01)

(52) U.S. Cl.
CPC ......... *H04N 5/3698* (2013.01); *H04N 5/3575* (2013.01); *H04N 5/378* (2013.01); *H04N 5/3745* (2013.01); *H04N 5/3765* (2013.01)

(58) Field of Classification Search
CPC .... H04N 5/3698; H04N 5/378; H04N 5/3765; H04N 5/3745; H04N 5/3575
See application file for complete search history.

(56) References Cited

U.S. PATENT DOCUMENTS

| 9,288,417 | B2 | 3/2016 | Tanaka | |
|---|---|---|---|---|
| 2013/0032695 | A1* | 2/2013 | Ishibashi | H04N 5/378 250/208.1 |
| 2017/0318248 | A1* | 11/2017 | Maehashi | H04N 5/378 |
| 2017/0366771 | A1 | 12/2017 | Jung et al. | |

* cited by examiner

*Primary Examiner* — Mekonnen D Dagnew
(74) *Attorney, Agent, or Firm* — F. Chau & Associates, LLC (57) ABSTRACT

A comparing circuit may include a first amplifier and a second amplifier. The first amplifier performs a correlated double sampling operation in response to a pixel signal and a ramp signal, and the second amplifier amplifies an output signal of the first amplifier. The second amplifier includes a current stabilization circuit that supplies current to the second amplifier during the correlated double sampling operation irrespective of the output signal of the first amplifier.

10 Claims, 11 Drawing Sheets

COMPARING CIRCUIT AND AN IMAGE SENSOR INCLUDING A CURRENT STABILIZATION CIRCUIT

CROSS-REFERENCE TO RELATED APPLICATION

This patent application is a Continuation-in-Part (CIP) of U.S. patent application Ser. No. 15/622,477, which claims priority under 35 U.S.C. § 119 to Korean Patent Application No. 10-2016-0074692, filed on Jun. 15, 2016 in the Korean Intellectual Property Office (KIPO), the disclosure of which is incorporated by reference herein in its entirety.

TECHNICAL FIELD

Exemplary embodiments of the inventive concept relate to image sensors, and more specifically, to a comparing circuit and an image sensor including a current stabilization circuit.

DISCUSSION OF RELATED ART

An image sensor converts an optical image into an electrical signal. With the recent advances in the computer and communication industries, demand for image sensors with increased performance is growing for various applications, such as digital cameras, camcorders, personal communication systems (PCS), game consoles, security cameras, medical micro-cameras, etc.

An image sensor includes a charge coupled device (CCD) and a complementary metal-oxide-semiconductor (CMOS) image sensor. Since the CMOS image sensor has a relatively simple driving technique and may integrate a signal processing circuit into a single chip, a product using the CMOS image sensor may be likelier to miniaturize. The CMOS image sensor may be readily applied to a product with limited battery capacity because of its low power consumption. Moreover, since the CMOS image sensor may interchangeably use CMOS process technology, the CMOS image sensor may contribute to reduction in cost. For at least these reasons and the ability to increase resolution, the use of CMOS image sensors is rapidly growing.

A CMOS image sensor includes a comparing circuit. The comparing circuit compares a signal sensed at a sensor array of the CMOS image sensor with a ramp signal generated in a ramp generator to generate a digital signal. One of a plurality of amplifiers included in the comparing circuit may allow dynamic current to flow, thereby resulting in power fluctuation. The power fluctuation causes performance of the CMOS image sensor to be degraded.

SUMMARY

According to an exemplary embodiment of the inventive concept, a comparing circuit includes a first amplifier configured to perform a correlated double sampling (CDS) operation in response to a pixel signal and a ramp signal and a second amplifier configured to amplify an output signal of the first amplifier. The second amplifier may include a current stabilization circuit configured to supply current to the second amplifier during the CDS operation irrespective of the output signal of the first amplifier.

According to an exemplary embodiment of the inventive concept, an image sensor includes a sensor array configured to convert light into an electrical signal to generate a pixel signal, a ramp signal generator configured to generate a ramp signal, and a comparing circuit configured to perform a correlated double sampling (CDS) operation in response to the pixel signal and the ramp signal. The comparing circuit may include a first amplifier configured to perform the CDS operation and a second amplifier configured to amplify an output signal of the first amplifier. The second amplifier may include a current stabilization circuit configured to supply current to the second amplifier during the CDS operation irrespective of the output signal of the first amplifier.

According to an exemplary embodiment of the inventive concept, a comparing circuit includes a first amplifier and a second amplifier. The second amplifier includes a first transistor, a second transistor, a third transistor, and a current stabilization circuit. The first transistor is coupled between a power supply terminal and a first node, and has a gate connected to a correlated double sampling (CDS) signal source. The second transistor is coupled between a ground terminal and the first node, and has a gate connected to a second node. The third transistor is coupled between the first node and the second node, and has a gate connected to a switching signal source. The current stabilization circuit includes a fourth transistor coupled between the first node and the power supply terminal and having a gate connected to the second node.

BRIEF DESCRIPTION OF THE DRAWINGS

The above and other features of the inventive concept will be more clearly understood by describing in detail exemplary embodiments thereof with reference to the accompanying drawings.

DETAILED DESCRIPTION OF THE EMBODIMENTS

Exemplary embodiments of the inventive concept will be described more fully hereinafter with reference to the accompanying drawings. Like reference numerals may refer to like elements throughout this application.

Exemplary embodiments of the inventive concept relate to a comparing circuit including a current stabilization circuit to prevent power fluctuation of the comparing circuit and an image sensor including the current stabilization circuit.

Figure 1:
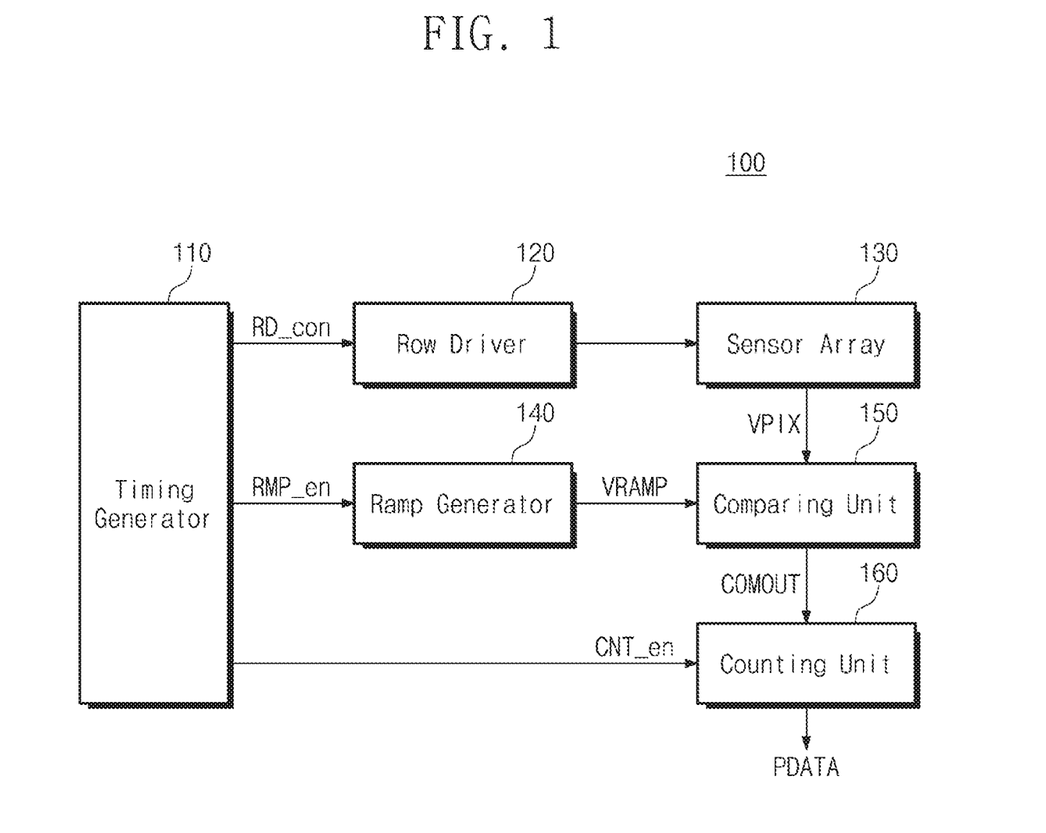
FIG. 1 is a block diagram of an image sensor according to an exemplary embodiment of the inventive concept.

FIG. 1 is a block diagram of an image sensor 100 according to an exemplary embodiment of the inventive concept. As illustrated, the image sensor 100 may include a timing signal generator 110, a row driver 120, a ramp signal generator 140, a comparing unit 150, and a counting unit 160.

The timing signal generator 110 generates timing signals in response to a control signal for generating the timing signals. For example, the timing signal generator 110 may generate a row driver control signal RD_con to control operation of the row driver 120. The timing signal generator 110 may generate a ramp enable signal RMP_en to control operation of the ramp signal generator 140. The timing signal generator 110 may generate a counter enable signal CNT_en to control operation of the counting unit 160.

The row driver 120 sequentially drives a plurality of rows of the sensor array 130 in response to the row driver control signal RD_con. For example, the row driver 120 may be electrically connected to the plurality of rows of the sensor array 130. Pixels of a selected row may convert sensed light into a pixel signal VPIX that is an electrical signal.

The sensor array 130 includes a plurality of photodetection devices. The sensor array 130 includes a plurality of rows and a plurality of columns. For example, the photodetection devices may be arranged at intersections of the rows and the columns.

Each of the photodetection devices may be a photodiode, a phototransistor, a photogate, a pinned photodiode (PPD), or a combination thereof. For example, the photodetection device may have a four-transistor structure including a photodiode, a transfer transistor, a reset transistor, an amplifier transistor, and a selection transistor. Alternatively, the photodetection device may have a one-transistor structure, a three-transistor structure, a five-transistor structure, or a structure in which a plurality of pixels share some transistors. As described above, the sensor array 130 may convert sensed light into the pixel signal VPIX and transmit the pixel signal VPIX to the comparing unit 150.

The ramp signal generator 140 generates a ramp signal VRAMP in response to the ramp enable signal RMP_en. For example, the ramp signal VRAMP is a signal whose voltage level increases or decreases in proportion to time. The ramp signal VRAMP may be transmitted to the comparing unit 150 to be used to convert an analog signal to a digital signal.

The comparing unit 150 receives the ramp signal VRAMP and the pixel signal VPIX. The comparing unit 150 compares the ramp signal VRAMP and the pixel signal VPIX with each other to transmit a comparator signal COMOUT to the counting unit 160. For example, the comparing unit 150 may perform a correlated double sampling (CDS) operation to reduce noise. Accordingly, the comparing unit 150 may further include a CDS circuit that extracts a noise-removed signal from a difference between a reference signal and the pixel signal VPIX.

The counting unit 160 may generate a counting signal corresponding to the ramp signal VRAMP in response to the counter enable signal CNT_en. For example, the counting unit 160 may start a counting operation when the ramp signal VRAMP starts. The counting unit 160 may convert the comparator signal COMOUT received from the comparing unit 150 into digital information to output pixel data PDATA.

The comparing unit 150 may include a plurality of comparators. The comparators may each include an amplifier to which dynamic current flows. When the dynamic current flows to the comparator, performance of the CDS operation may be degraded. Accordingly, each of the comparators included in the comparing unit 150 may include a current stabilization circuit. The current stabilization circuit may suppress dynamic current generation of each of the comparators included in the comparing unit 150.

Figure 2:
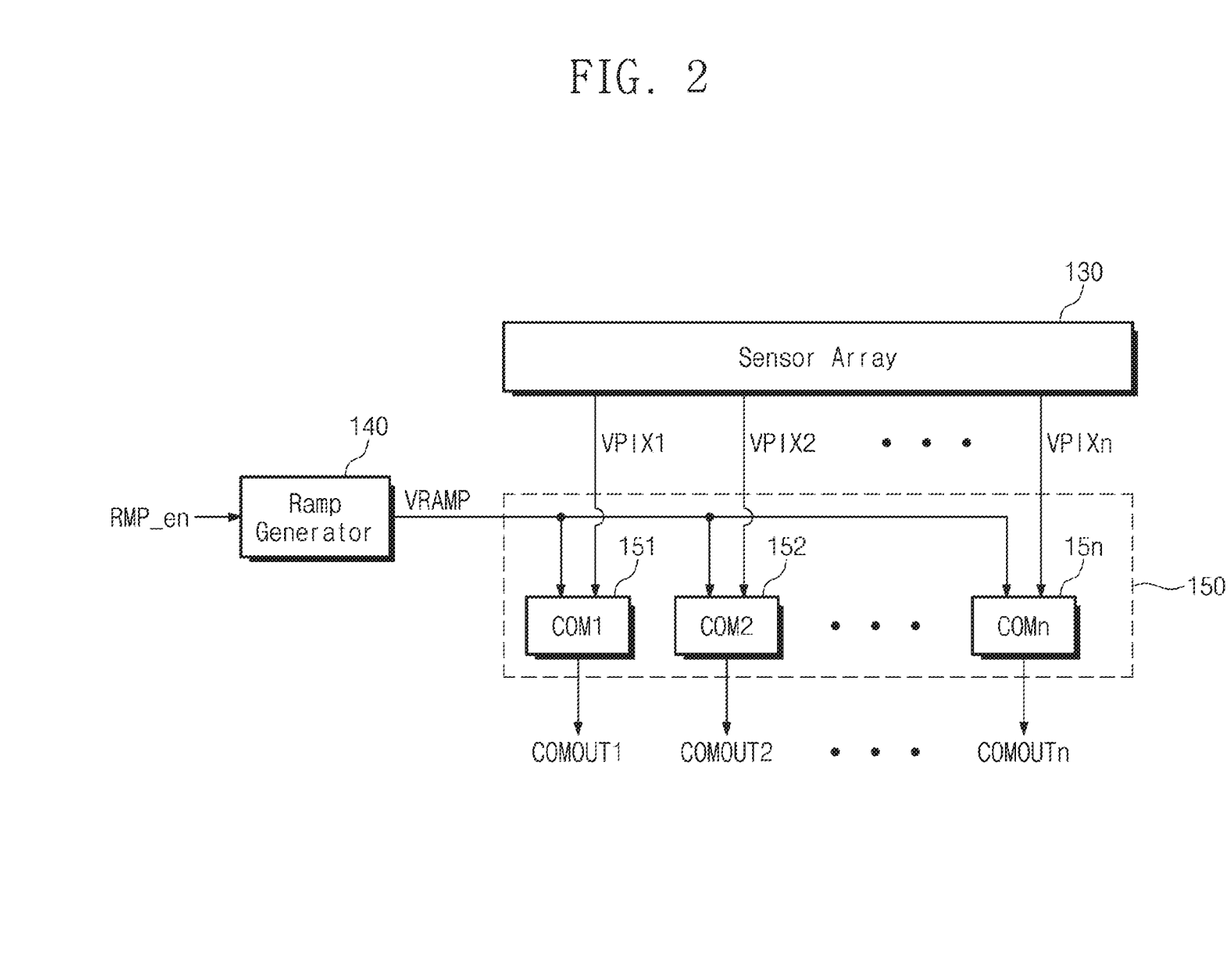
FIG. 2 illustrates a comparing unit in FIG. 1 according to an exemplary embodiment of the inventive concept.

FIG. 2 illustrates the comparing unit 150 in FIG. 1 according to an exemplary embodiment of the inventive concept. As illustrated, the sensor array 130 may include a plurality of columns. For example, the comparing unit 150 may include a plurality of comparators 151 to 15$n$ connected to the plurality of columns of the sensor array 130. The ramp signal generator 140 may generate the ramp signal VRAMP in response to the ramp enable signal RMP_en. The ramp signal VRAMP may be provided to each of the comparators 151 to 15$n$.

Each pixel of the sensor array 130 may convert light into an electrical signal. Pixels connected to a selected row of the sensor array 130 may output pixel signals VPIX1 to VPIXn. Each of the comparators 151 to 15$n$ may compare the ramp signal VRAMP to each of the pixel signals VPIX1 to VPIXn and output comparator signals COMOUT1 to COMOUTn. For example, the first comparator 151 may compare the ramp signal VRAMP with the first pixel signal VPIX1 to output the first comparator signal COMOUT1. The second comparator 152 may compare the ramp signal VRAMP with the second pixel signal VPIX2 to output the second comparator signal COMOUT2. The $n^{th}$ comparator 15$n$ may compare the ramp signal VRAMP with the $n^{th}$ pixel signal VPIXn to output the $n^{th}$ comparator signal COMOUTn.

For example, each of the comparators 151 to 15$n$ may perform a CDS operation. Each of the comparators 151 to 15$n$ may perform the CDS operation using the ramp signal VRAMP and each of the pixel signals VPIX1 to VPIXn, respectively. The comparator signals COMOUT1 to COMOUTn are transmitted to counters included in the counting unit 160. The counters included in the counting unit 160 may count and convert the comparator signals COMOUT1 to COMOUTn into digital codes.

Figure 3:
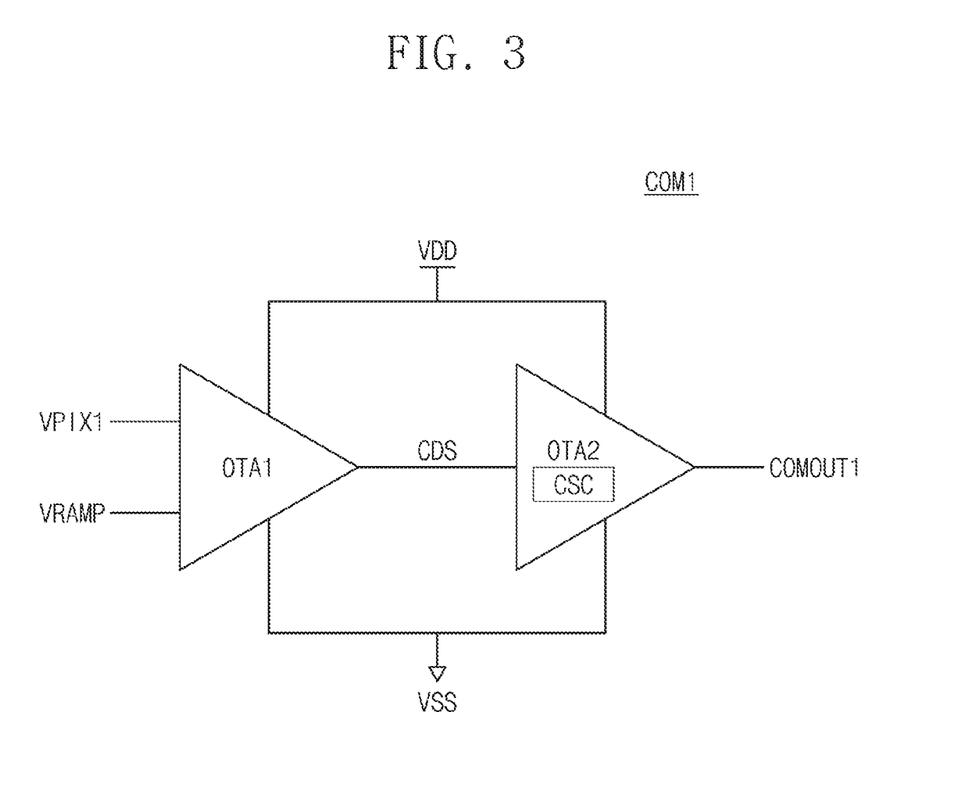
FIG. 3 is a circuit diagram of a comparator in FIG. 2 according to an exemplary embodiment of the inventive concept.

FIG. 3 is a circuit diagram of the first comparator COM1 in FIG. 2. As illustrated, the first comparator COM1 may include a first amplifier OTA1 and a second amplifier OTA2. Although only the first comparator COM1 is illustrated in FIG. 3, the other comparators COM2 to COMn in FIG. 2 may have the same or a similar structure and perform the same or a similar operation.

The first amplifier OTA1 may receive the ramp signal VRAMP and the first pixel signal VPIX1. For example, the first amplifier OTA1 may perform a CDS operation. The first amplifier OTA1 may generate a CDS signal CDS through the CDS operation. The second amplifier OTA2 may amplify the CDS signal CDS to output the first comparator signal COMOUT1.

The first amplifier OTA1 and the second amplifier OTA2 are driven by a power supply voltage VDD. The first amplifier OTA1 may allow static current to flow during its operation, while the second amplifier OTA2 may allow dynamic current to flow during its operation. The dynamic current of the second amplifier OTA2 may cause fluctuation of the power supply voltage VDD.

The second amplifier OTA2 includes a current stabilization circuit CSC to prevent the dynamic current from flowing. For example, the current stabilization circuit CSC may allow constant current to flow during operation of the second amplifier OTA2, irrespective of the CDS signal CDS, to prevent dynamic current from flowing.

When the dynamic current is generated, a ground terminal of the first amplifier OTA1 and a ground terminal of the second amplifier OTA2 should be separated from each other.

Due to the separation of the ground terminals, two or more ground pads are needed. As the number of ground pads increases, the number of wires between the first comparator COM1 and the ground pads also increases.

The second amplifier OTA2 may prevent generation of dynamic current through the current stabilization circuit CSC. Thus, the second amplifier OTA2 may use the same ground terminal as the first amplifier OTA1. Accordingly, the number of ground pads and wires may decrease.

Figure 4A:
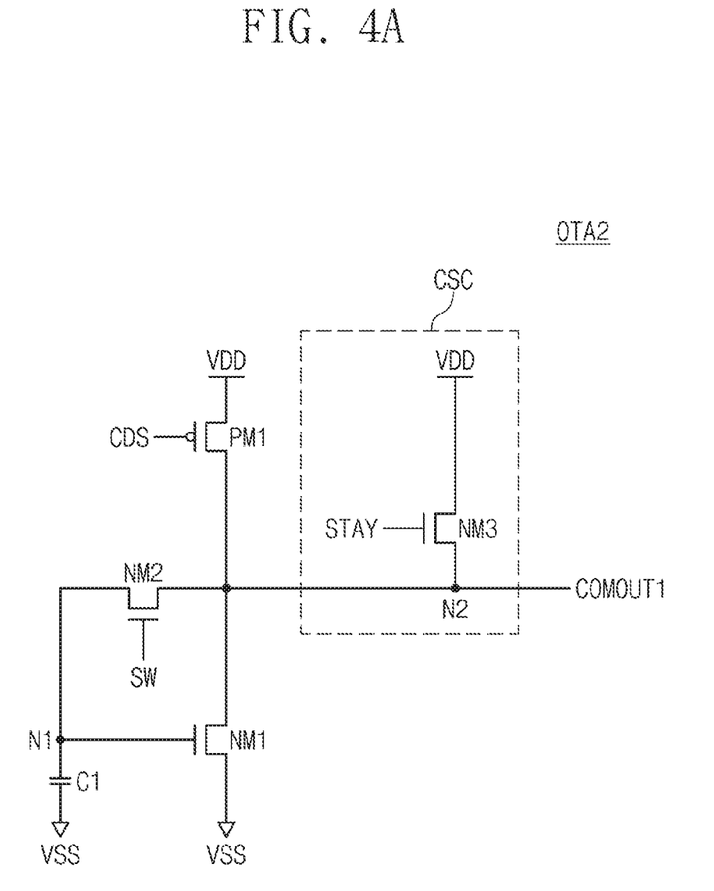
FIGS. 4A to 4C illustrate a second amplifier in FIG. 3 according to exemplary embodiments of the inventive concept.
Figure 4B:
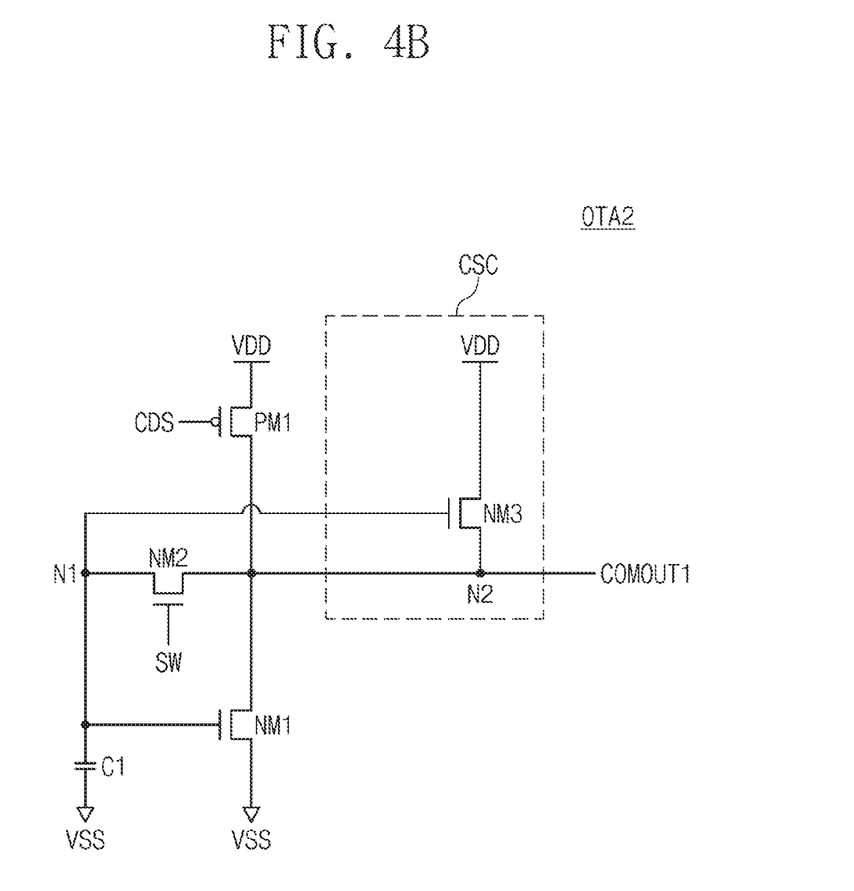
Figure 4C:
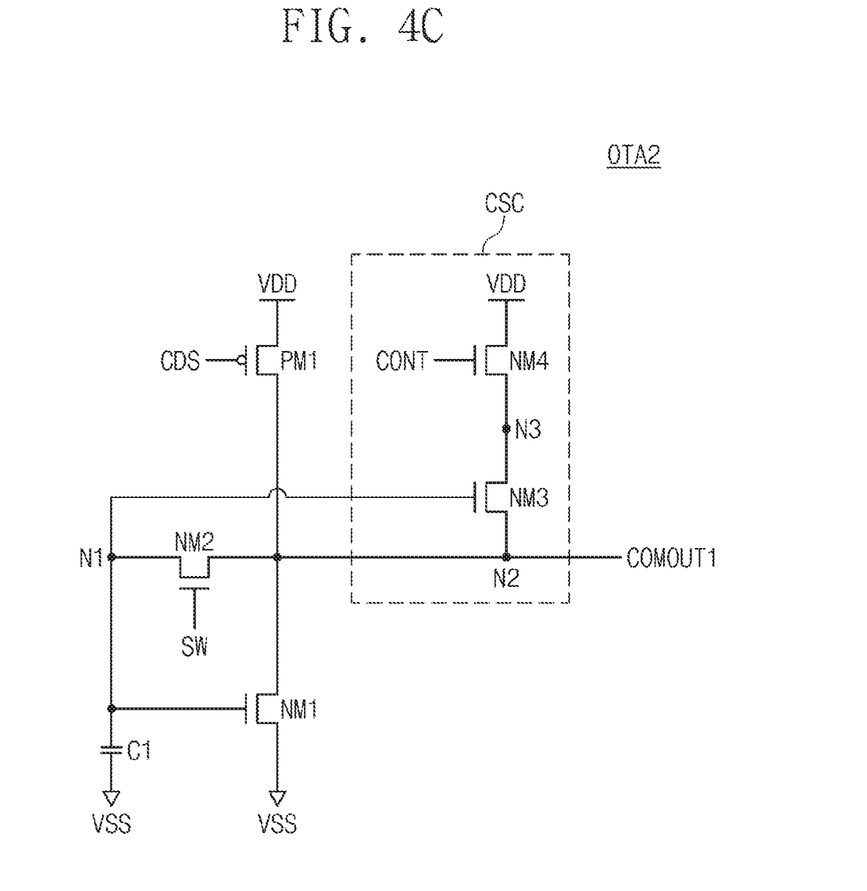

FIGS. 4A to 4C illustrate the second amplifier OTA2 in FIG. 3 according to exemplary embodiments of the inventive concept. In FIGS. 4A to 4C, the second amplifier OTA2 may include the current stabilization circuit CSC. The current stabilization circuit CSC may supply constant current to a second node N2 irrespective of the CDS signal CDS.

Referring to FIG. 4A, the second amplifier OTA2 may include a PMOS transistor PM1, first and second NMOS transistors NM1 and NM2, and a capacitor C1. The second amplifier OTA2 may amplify the CDS signal CDS to output the first comparator signal COMOUT1. For example, the PMOS transistor PM1 may be turned on or off in response to the CDS signal CDS. The PMOS transistor PM1 may determine a voltage level of the second node N2 according to the CDS signal CDS.

The first NMOS transistor NM1 may operate as a current source. When the PMOS transistor PM1 is turned on, the first NMOS transistor NM1 may control the current such that a constant current flows to the second node N2.

The second NMOS transistor NM2 may control a gate voltage level of the first NMOS transistor NM1 in response to a switching signal SW. When the second NMOS transistor NM2 is turned on, the capacitor C1 starts to be charged. When the second NMOS transistor NM2 is turned off, the capacitor C1 is maintained at the voltage level of the first node N1. The capacitor C1 may operate as a self-bias of the first NMOS transistor NM1.

Accordingly, if no current stabilization circuit exists when the PMOS transistor PM1 is turned off, current also does not flow to the first NMOS transistor NM1. The second amplifier OTA2 would then allow dynamic current to flow in response to the CDS signal CDS.

In this case, according to the present exemplary embodiment, the current stabilization circuit CSC may supply current to the second node N2 to prevent generation of dynamic current. For example, the current stabilization circuit CSC may include a third NMOS transistor NM3. The third NMOS transistor NM3 may be coupled between the power supply voltage VDD and the second node N2. When the PMOS transistor PM1 is turned off, the third NMOS transistor NM3 may supply current to the second node N2 in response to a current stabilization signal STAY. For example, the current stabilization signal STAY may be set such that current is always supplied to the second node N2 during operation of the second amplifier OTA2. The size of the flowing current may be set such that the first NMOS transistor NM1 is maintained at a saturated state.

Accordingly, constant current may flow to the second node N2 during operation of the second amplifier OTA2 and generation of dynamic current may be prevented. Moreover, fluctuation of the power supply voltage VDD may be reduced. In example embodiments, the power supply voltage VDD and the ground voltage VSS may be used in an analog circuit.

In FIGS. 4A to 4C, except for the current stabilization circuit CSC, the configurations and operations of the other components are identical or similar to one another. Therefore, descriptions of common components will be omitted below.

Referring to FIG. 4B, the current stabilization circuit CSC may include a third NMOS transistor NM3. In FIG. 4B, a gate of the third NMOS transistor NM3 may be connected to the first node N1. Accordingly, when the second NMOS transistor NM2 is turned on, the gate of the first NMOS transistor NM1 and the gate of the third NMOS transistor NM3 may be set to the same bias voltage. The first NMOS transistor NM1 and the third NMOS transistor NM3 may be controlled by the same self-bias voltage. As a result, constant current may flow to the second node N2 during operation of the second amplifier OTA2.

Referring to FIG. 4C, the current stabilization circuit CSC may include third and fourth NMOS transistors NM3 and NM4. The third NMOS transistor NM3 in FIG. 4C may operate substantially the same as the third NMOS transistor NM3 in FIG. 4B. In FIG. 4C, the fourth NMOS transistor NM4 may be coupled between the third NMOS transistor NM3 and the power supply voltage VDD terminal.

The fourth NMOS transistor NM4 may be turned on or off in response to a current control signal CONT. Thus, the current stabilization circuit CSC may supply current to the second node N2 in response to the current control signal CONT for a set time. The current stabilization circuit CSC in FIG. 4C may supply the current to the second node N2 for the set time to further reduce power consumption as compared to the current stabilization circuit CSC in FIG. 4B. For example, the current control signal CONT may be set such that current is supplied to the second node N2 only during a period in which the CDS operation is performed.

Figure 5:
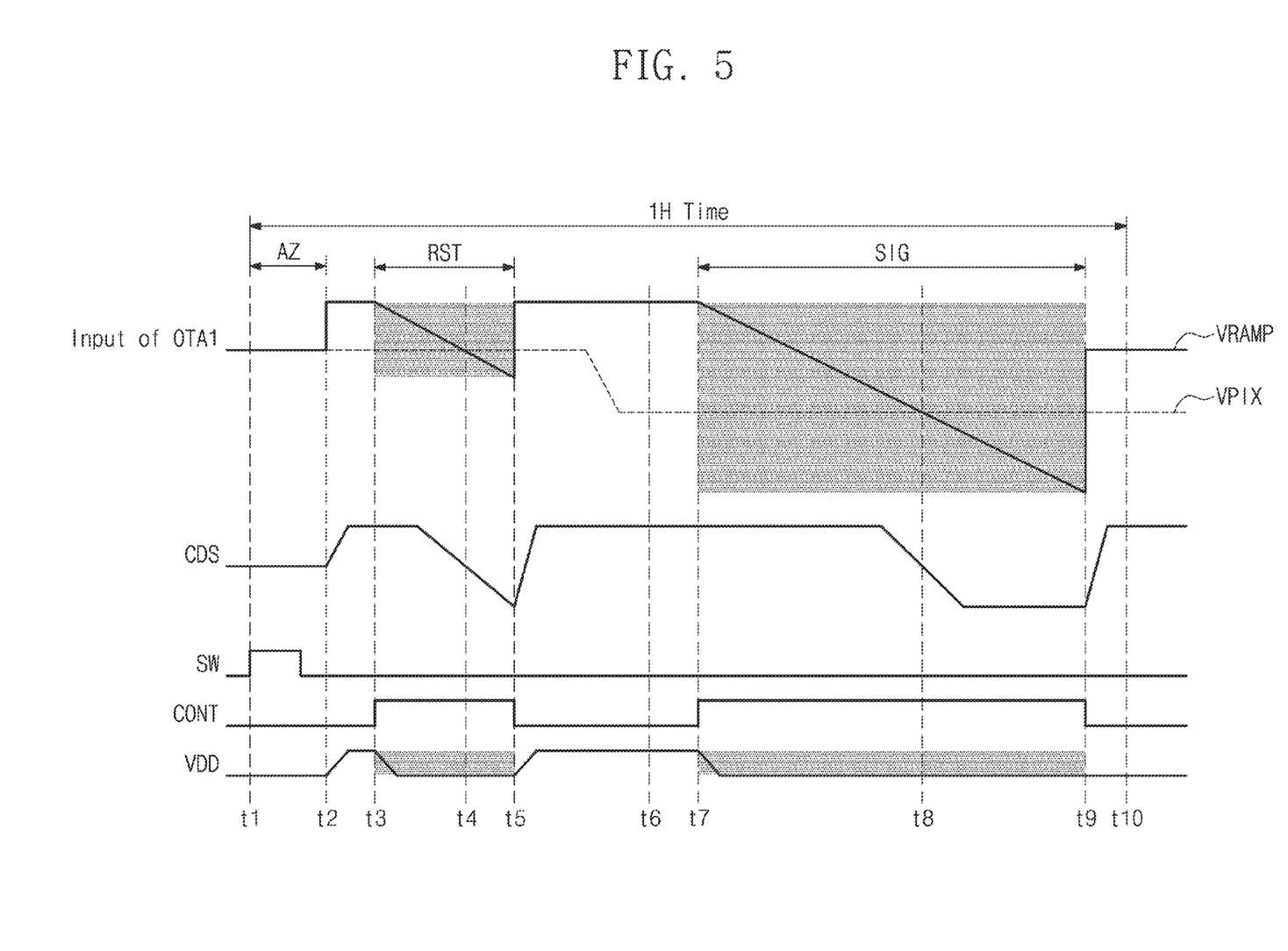
FIG. 5 is a timing diagram illustrating operation of the second amplifier in FIG. 4C according to an exemplary embodiment of the inventive concept.

FIG. 5 is a timing diagram illustrating operation of the second amplifier OTA2 in FIG. 4C according to an exemplary embodiment of the inventive concept. Referring to FIG. 5, "1H time" refers to the time taken to obtain pixel data PDATA at a single row. Since all pixels connected to a single row obtain data at the same time, 1H time may also be called time taken to obtain data at a single pixel. For the 1H time, the image sensor 100 may obtain the pixel data PDATA through an auto-zero period AZ, a reset period RST, and a signal period SIG. During the auto-zero period AZ, the image sensor 100 may match levels of the ramp signal VRAMP with the pixel signal VPIX. During the reset period RST, the image sensor 100 measures a value of a voltage staying on a pixel as a reference for obtaining accurate pixel data. For example, a residual voltage value measured during the reset period RST may vary by pixel. During the signal period SIG, the image sensor 100 converts light into an electrical signal to obtain the pixel data PDATA.

In the auto-zero period AZ, the CDS signal CDS may have a lower voltage than a threshold voltage of the PMOS transistor PM1. In this case, the PMOS transistor PM1 may be turned on.

In the auto-zero period AZ, the switching signal SW may have a high level. In this case, the second NMOS transistor NM2 may be turned on. Thus, the capacitor C1 may be charged. When the capacitor C1 is charged to increase a voltage level of the first node N1 to be higher than threshold voltages of the first and third NMOS transistors NM1 and NM3, the second NMOS transistor NM2 may be turned off in response to the switching signal SW. The capacitor C1 may be maintained at the voltage level of the first node N1 to perform self-bias. Thus, the first and third NMOS transistors NM1 and NM3 may be maintained at a turn-on state.

As a result, current generated by the PMOS transistor PM1 and the first NMOS transistor NM1 flows to the second node N2 during the auto-zero period AZ. At this point, the fourth NMOS transistor NM4 is turned off in response to the current control signal CONT.

After a second time point t2, when the CDS signal CDS has a higher voltage level than a threshold voltage of the PMOS transistor PM1, the PMOS transistor PM1 may be turned off. Thus, current does not flow to the second node N2 between the second time point t2 and a third time point t3. In addition, the current does not flow to the second node N2 between a sixth time point t6 and a seventh time point t7.

During the reset period RST and the signal period SIG, the current control signal CONT may have a high level. The fourth NMOS transistor NM4 is turned on in response to the current control signal CONT, and current flows to the second node N2 irrespective of the CDS signal CDS. Thus, the power supply voltage VDD and the ground voltage VSS may also maintain constant without their fluctuation during the reset period RST and the signal period SIG. The reset period RST and the signal period SIG are periods in which the CDS operation is performed. In other words, it is important to prevent dynamic current from flowing in the reset period RST and the signal period SIG. However, this is merely exemplary and the current control signal CONT may be set to be different from that shown in FIG. 5. For example, the current control signal CONT may have a high level between the second time point t2 and the third time point t3. In addition, the current control signal CONT may have a high level between the sixth time point t6 and a seventh time point t7.

As described above, the comparing unit 150 of the image sensor 100 includes the current stabilization circuit CSC that may allow constant current to flow to the second amplifier OTA2 irrespective of an output signal of the first amplifier OTA1. Thus, the image sensor 100 may prevent generation of dynamic current while the CDS operation is performed. As a result, performance degradation of the image sensor 100 caused by dynamic current may be reduced. Moreover, if generation of dynamic current is prevented, the first amplifier OTA1 and the second amplifier OTA2 of the comparing unit 150 may share a ground terminal. Accordingly, when the first amplifier OTA1 and the second amplifier OTA2 share the ground terminal, they may use a common ground pad to reduce an area of the image sensor 100.

Figure 6:
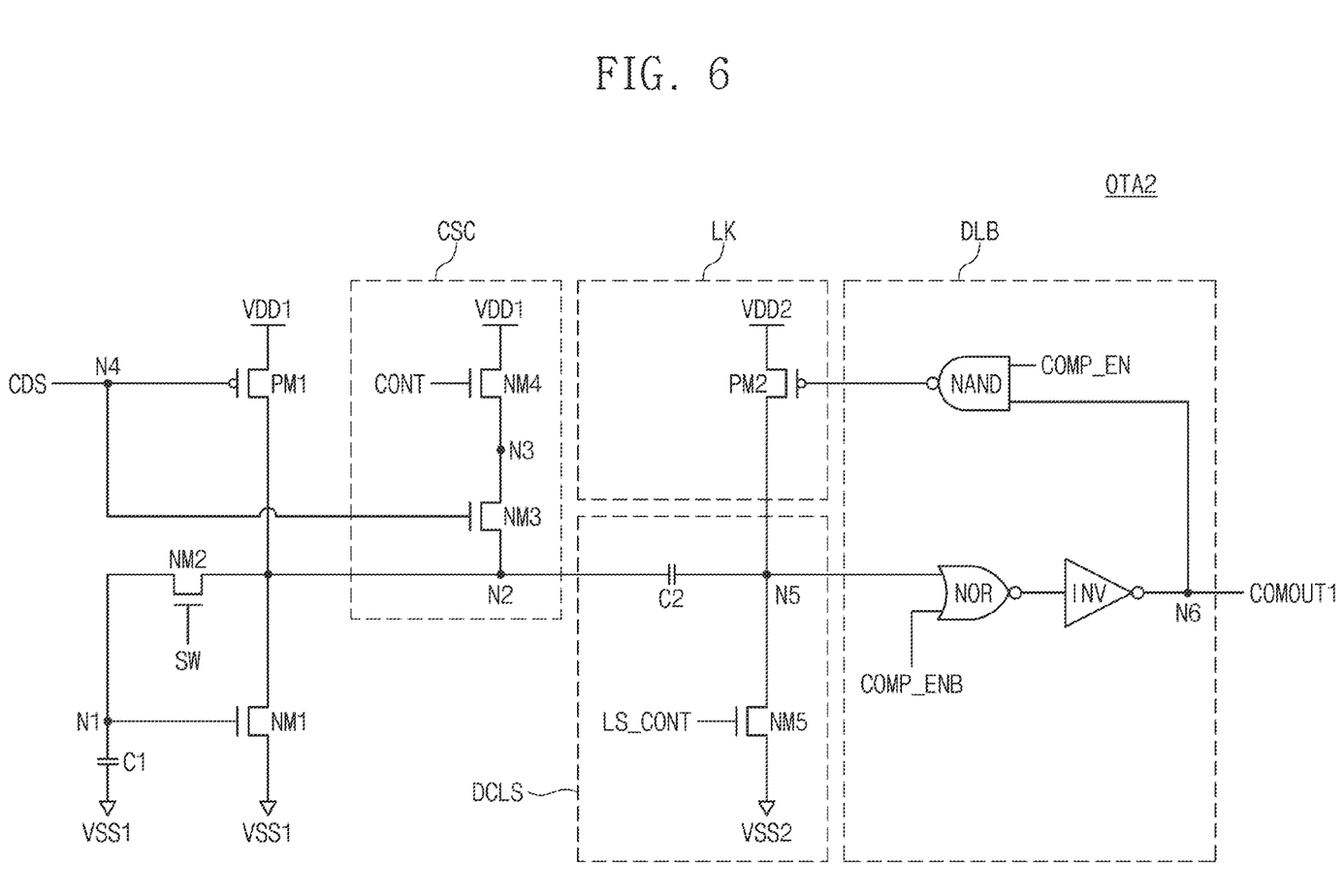
FIG. 6 is a circuit diagram illustrating another exemplary embodiment of the second amplifier OTA2 in FIG. 3.

FIG. 6 is a circuit diagram illustrating another example embodiment of the second amplifier OTA2 in FIG. 3. In FIG. 6, the second amplifier OTA2 may include a current stabilization circuit CSC. The current stabilization circuit CSC may supply constant current to a second node N2 irrespective of a correlated double sampling signal CDS. In addition, the second amplifier OTA2 may include a DC level shifter DCLS, a level keeper LK, and a digital logic block DLB.

Referring to FIG. 6, the second amplifier OTA2 may include a first PMOS transistor PM1, first and second NMOS transistors NM1 and NM2, and a first capacitor C1. The second amplifier OTA2 may amplify the correlated double sampling signal CDS to output a first comparator signal COMOUT1. For example, the first PMOS transistor PM1 may be turned on or off according to the correlated double sampling signal CDS. The first PMOS transistor PM1 may determine a voltage level of the second node N2 according to the correlated double sampling signal CDS.

The first NMOS transistor NM1 may operate as a current source. When the first PMOS transistor PM1 is turned on, the first NMOS transistor NM1 may control constant current to flow to the second node N2.

The second NMOS transistor NM2 may control a gate voltage level of the first NMOS transistor NM1 according to a switching signal SW. When the second NMOS transistor NM2 is turned on, a first capacitor C1 starts to be charged. When the second NMOS transistor NM2 is turned off, the first capacitor C1 is maintained at a voltage level of the first node N1. The first capacitor C1 may operate as a self-bias of the first NMOS transistor NM1.

When the first PMOS transistor PM1 is turned off, current also does not flow to the first NMOS transistor NM1 if there is no current stabilization circuit CSC. Thus, the second amplifier OTA2 allows dynamic current to flow according to the correlated double sampling signal CDS.

In this case, the current stabilization circuit CSC may supply current to the second node N2 to prevent generation of dynamic current. The current stabilization circuit CSC may include third and fourth NMOS transistors NM3 and NM4. The third and fourth NMOS transistors NM3 and NM4 may be coupled in series between a first power supply voltage VDD1 terminal and the second node N2. The third NMOS transistor NM3 may be turned on or off according to the correlated double sampling signal CDS. The fourth transistor NM4 may be turned on or off according to a current control signal CONT. Thus, the current stabilization circuit CSC may supply current to the second node N2 according to the current control signal CONT for a set period of time. For example, the current control signal CONT may be set to supply current to the second node N2 only during a period in which a correlated double sampling operation is performed.

The DC level shifter DCLS may adjust the voltage level of the second node N2. For example, in FIG. 6, the third NMOS transistor NM3 is turned on according to a voltage level of a fourth mode N4. Thus, the voltage level of the second node N2 may be determined based on the voltage level of the fourth node N4. Since the voltage level of the fourth node N4 corresponds to the correlated double sampling signal CDS, the voltage level of the fourth node N4 may be different from a voltage level used in a digital circuit, e.g., coupling unit 160 (see FIG. 1), connected to a back end of the second amplifier OTA2. That is, the DC level shifter DCLS may adjust the voltage level of the second node N2 for the digital circuit connected to the back end of the second amplifier OTA2.

For example, the DC level shifter DCLS may include a second capacitor C2 and a fifth NMOS transistor NM5. The second capacitor C2 may be coupled between the second node N2 and a fifth node N5. The second capacitor C2 may maintain a difference between voltages at the second node N2 and the fifth node N5 to shift a voltage at the second node N2. The fifth NMOS transistor NM5 may be coupled between the fifth node N5 and a second ground terminal VSS2 terminal. The fifth NMOS transistor NM5 may be turned on or off based on a level shifter control signal LS_CONT. Thus, a voltage level of the fifth node N5 may be determined according to a second ground voltage VSS2.

The level keeper LK may compensate a logic error of the fifth node N5. For example, the level keeper LK may include a second PMOS transistor PM2. When the second PMOS transistor PM2 is turned on, a voltage level of the fifth node N5 may be maintained at a second power supply voltage VDD2. Thus, the fifth node N5 may have a complete high level.

The digital logic block DLB may output a first comparator signal COMOUT1 based on the voltage level of the fifth node N5. For example, the digital logic block DLB may output the first comparator signal COMOUT1 based on the comparator enable signal COMP_EN and the logic level of the fifth node N5. The first comparator signal COMOUT1 may have a high level when the comparator enable signal COMP_EN is a low level or a logic level of the fifth node N5 is high level. The digital logic block DLB may include a NAND gate NAND, a NOR gate NOR, and an inverter INV. However, the configuration is merely an example embodiment and it should be appreciated that the digital logic block DLB is not to be construed as being limited by the example embodiment. The digital logic block DBL may include a combination of other logic gates having the same function.

As described above, while the second amplifier OTA2 operates, constant current may flow to the second node N2 and the dynamic current may be prevented from being generated in the second amplifier OTA2. In addition, fluctuation of the first power supply voltage VDD1 and the first ground voltage VSS1 may be reduced. In example embodiments, the first power supply voltage VDD1 and the first ground voltage VSS1 may be used in an analog circuit and the second power supply voltage VDD2 and the second ground voltage VSS2 may be used in a digital circuit.

Figure 7:
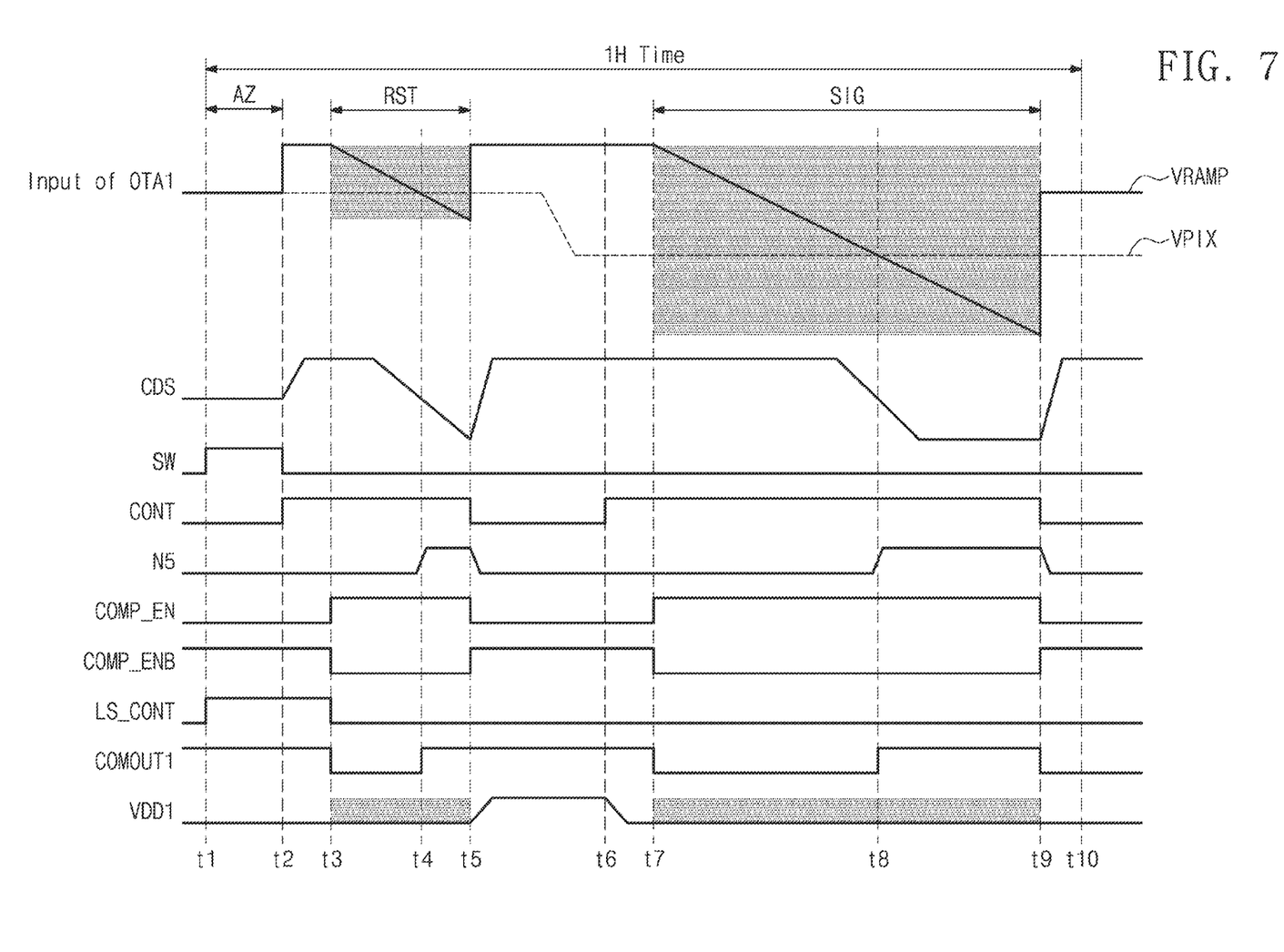
FIG. 7 is a timing diagram illustrating the operation of the second amplifier OTA2 in FIG. 6.

FIG. 7 is a timing diagram illustrating the operation of the second amplifier OTA2 in FIG. 6. Referring to FIG. 7, an image sensor 100 may obtain pixel data PDATA through an auto-zero period AZ, a reset period RST, and a signal period SIG for a 1H time. During the auto-zero period AZ, the image sensor 100 matches levels of a ramp signal VRAMP and a pixel signal VPIX. During the reset period RST, the image sensor 100 measures a value of a residual voltage in a pixel as a reference for obtaining accurate pixel data PDATA. For example, the value of the residual voltage measured during the reset period RST may vary depending on pixel. During the signal period SIG, the image sensor 100 converts light into an electrical signal to obtain the pixel data PDATA.

During the auto-zero period AZ, the correlated double sampling signal CDS may have a lower voltage level than a threshold voltage of the first PMOS transistor PM1. At this point, the first PMOS transistor PM1 may be turned on.

During the auto-zero period, the switching signal SW may have a high level. At this point, the second NMOS transistor NM2 may be turned on. Thus, the first capacitor C1 may be charged. When the first capacitor C1 is charged and the voltage level of the first node N1 increases to be higher than a threshold voltage level of the first NMOS transistor NM1, the second NMOS transistor NM2 may be turned off according to the switching signal SW. The first capacitor C1 may be maintained at the voltage level of the first node N1 to perform self-bias. Thus, the first NMOS transistor MN1 may maintain turned-on. The amount of current flowing to the second node N2 may be determined by the first NMOS transistor NM1. That is, the first NMOS transistor NM1 may operate as a current source.

Accordingly, the current generated by the first PMOS transistor PM1 and the first NMOS transistor NM1 flows to the second node N2 during the auto-zero period AZ. At this point, the third NMOS transistor NM3 is turned off according to the correlated double sampling signal CDS and the fourth NMOS transistor NM4 is turned off according to the current control signal CONT.

After the second time point t2, when the correlated double sampling signal CDS has a higher voltage level than the threshold voltage of the first PMOS transistor PM1, the first PMOS transistor PM1 may be turned off according to the voltage level of the correlated double sampling signal CDS. On the other hand, for a period of time between the second time point t2 and the third time point t3, the third NMOS transistor NM3 is turned on according to the correlated double sampling signal CDS and the fourth NMOS transistor NM4 is turned on according to the current control signal CONT. Thus, the current generated by the first, third, and fourth NMOS transistors NM1, NM3, and NM4 flows to the second node N2. The amount of the current flowing to the second node N2 may be determined by the first NMOS transistor NM1. That is, the first NMOS transistor NM1 may operate as a current source. Thus, the same current as during the auto-zero period AZ may flow to the second node N2 for a period of time between the second time point t2 and the third time point t3.

During the reset period RST and the signal period SIG, the current control signal CONT may have a high level. The fourth NMOS transistor NM4 may be turned on according to the current control signal CONT. At this point, the first PMOS transistor PM1 and the third NMOS transistor NM3 may be partially turned on according to the correlated double sampling signal CDS. In addition, the first PMOS transistor PM1 and the third NMOS transistor NM3 may be complementarily turned on. The amount of the current flowing to the second node N2 may be determined by the first NMOS transistor NM1. That is, the first NMOS transistor NM1 may operate as a current source. Thus, the same current as during the auto-zero period AZ flows to the second node N2 during the reset period RST and the signal period SIG.

The reset period RST and the signal period SIG are periods in which a correlated double sampling operation is performed. That is, it is important to prevent dynamic current from flowing to the second amplifier OTA2 during the reset period RST and the signal period SIG.

Now, operations of the digital circuits DCLS, LK, and DLB will be described. The digital logic block DLB may output a first comparator signal COMOUT1 based on the comparator enable signal COMP_EN and the logic level of the fifth node N5. For example, the level shifter control signal LS_CONT is high level and the comparator enable signal COMP_EN is low level for a period of time between the first time point t1 and the third time point t3. Thus, at this point, the inverse comparator enable signal COMP_ENB may be high level and the first comparator signal COMOUT1 may be high level due to the NOR gate NOR and the inverter INV. Similarly, for a period of time between the third time point t3 and the fourth time point t4, the inverse comparator enable signal COMP_ENB may be low level and the first comparator signal COMOUT1 may be low level due to the NOR gate NOR and the inverter INV. For a period of time between the fourth time point t4 and the fifth time point t5, the logic level of the fifth node N5 may be high level and the first comparator signal COMOUT1 may be high level due to the NOR gate NOR and the inverter INV. That is, the first comparator signal COMPOUT1 may be high level when one of the voltage levels of the inverse comparator enable signal COMP_ENB and the fifth node N5 is high level. In this case, the second PMOS transistor PM2 may be turned on by an output level of the NAND gate NAND and the logic level of the fifth node N5 may be accurately set to be high level.

Operations of the digital circuits DCLS, LK, and DLB for a period of time between the fifth time point t5 and the ninth time point t9 may be identical or similar to those of the digital circuits DCLS, LK, and DLB for a period of time between the first time point t1 and the fifth time point t5. The counting unit 160 (see FIG. 1) may count a time at which the first comparator signal COMOUT1 is low level. The counting unit 160 may generate pixel data PDATA through a difference between the whole time of the reset period RT or the signal period SIG and a time measured by the first comparator signal COMOUT1.

The comparing unit 150 of the image sensor 100 may allow constant current to flow to the second amplifier OTA2 irrespective of an output signal of the first amplifier OTA1 as well as the current stabilization circuit CSC. Moreover, the comparing unit 150 may further prevent generation of dynamic current through the digital circuits DCLS, LK, and DLB. Thus, the image sensor 100 may prevent generation of the dynamic current during the correlated double sampling operation. As a result, performance degradation of the image sensor 100 caused by the dynamic current may be reduced. Additionally, if the generation of the dynamic current is prevented, the first amplifier OTA1 and the second amplifier OTA2 of the comparing unit 150 may share a ground terminal. When the first amplifier OTA1 and the second amplifier OTA2 share the ground terminal, they may use a common ground pad. Accordingly, an area of the image sensor may be reduced.

Figure 8:
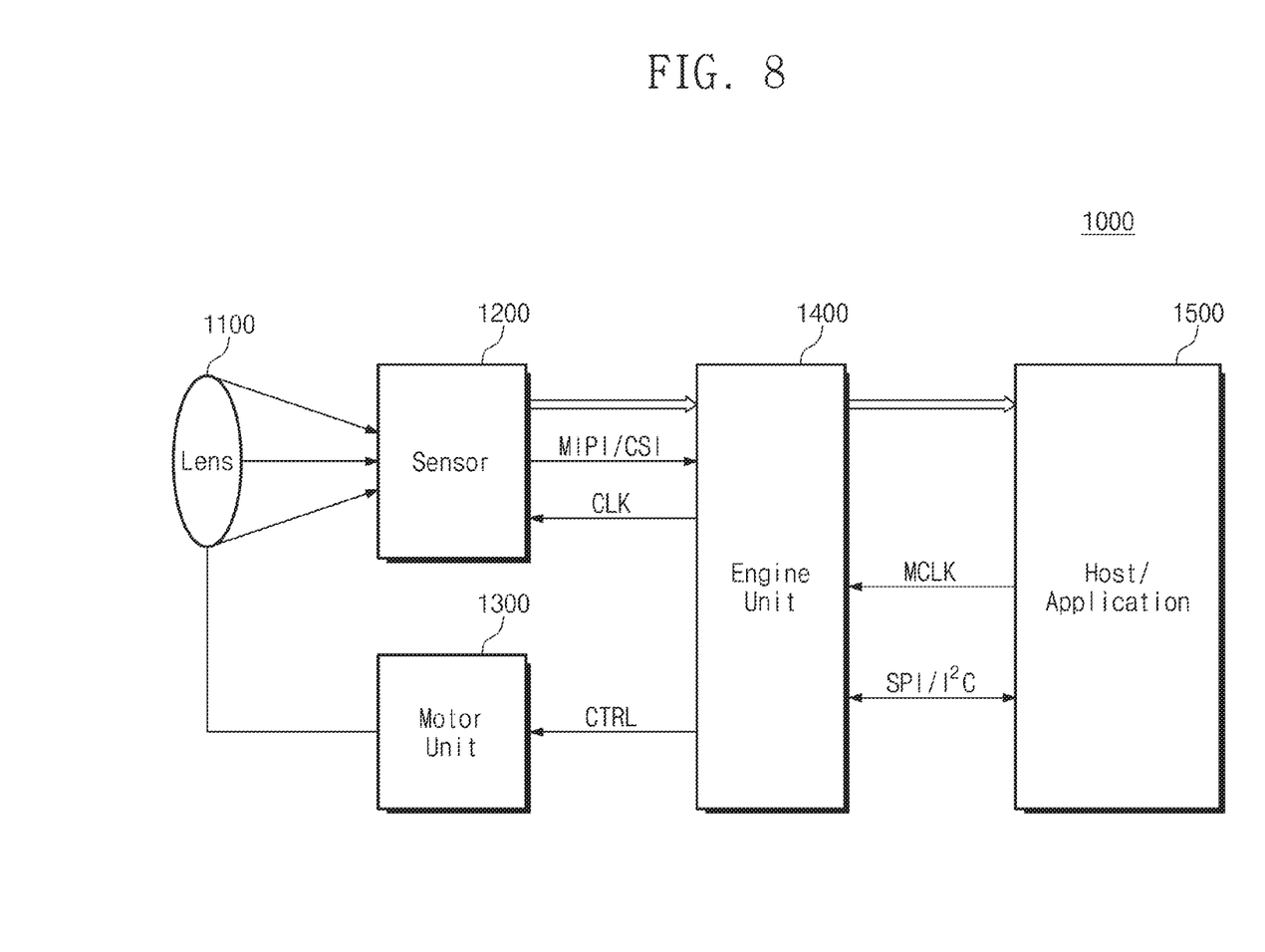
FIG. 8 illustrates a camera system including an image sensor according to an exemplary embodiment of the inventive concept.

FIG. 8 illustrates a camera system 1000 including an image sensor according to an exemplary embodiment of the inventive concept. For example, the camera system 1000 may include a digital camera. As illustrated, the camera system 1000 may include a lens 1100, an image sensor 1200, a motor unit 1300, and an engine unit 1400. The image sensor 1200 may include the current stabilization circuit, according to an exemplary embodiment of the inventive concept, to prevent generation of dynamic current.

The lens 100 focuses incident light onto a light receiving area of the image sensor 1200. The image sensor 1200 may generate RGB data of a Bayer pattern based on light impinging via the lens 1100. The image sensor 1200 may provide the RGB data based on a clock signal CLK. For example, the image sensor 1200 may interface with the engine unit 1400 through a mobile industry processor interface (MIPI) or a camera serial interface (CSI). The motor unit 1300 may adjust a focus of the lens 1100 or perform shuttering in response to a control signal CTRL received from the engine unit 1400. The engine unit 1400 may control the image sensor 1200 and the motor unit 1300. Additionally, the engine unit 1400 may generate YUV data or compressed data, e.g., Joint Photography Experts Group (JPEG) data, based on the RGB data received from the image sensor 1200. The YUV data includes a luminance component, a difference between the luminance component and a blue component, and a difference between the luminance component and a red component.

The engine unit 1400 may be connected to a host/application 1500, and the engine unit 1400 may provide the YUV data or the JPEG data to the host/application 1500 based on a master clock MCLK. Additionally, the engine unit 1400 may interface with the host/application 1500 through a serial peripheral interface (SPI) or an inter integrated circuit (I²C).

Figure 9:
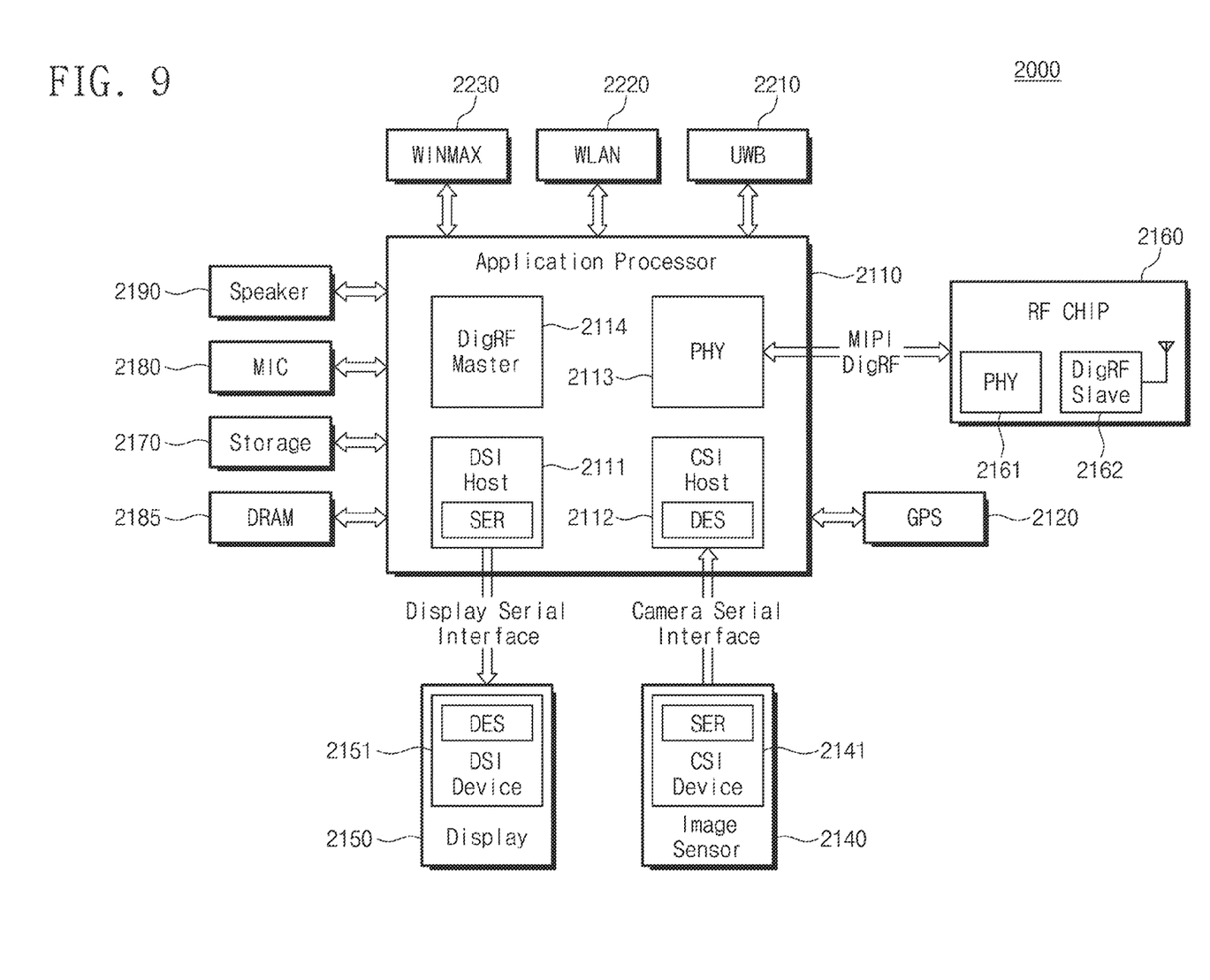
FIG. 9 illustrates an electronic system including an image sensor and an interface according to an exemplary embodiment of the inventive concept.

FIG. 9 illustrates an electronic system 2000 including an image sensor and an interface according to an exemplary embodiment of the inventive concept. The electronic system 2000 may be implemented with a data processing device that is capable of using or supporting a MIPI interface, e.g., a mobile phone, a personal digital assistant (PDA), a portable multimedia player (PMP), or a smart phone. As illustrated, the electronic system 2000 may include an application processor 2110, an image sensor 2140, and a display 2150. The image sensor 2140 may include the current stabilization circuit, according to an exemplary embodiment of the inventive concept, to prevent generation of dynamic current.

A CSI host 2112 implemented in the application processor 2110 may perform serial communication with a CSI device 2141 of the image sensor 2140 through CSI. For example, the CSI host 2112 may include a deserializer DES and the CSI device 2141 may include a serializer SER.

A display serial interface (DSI) host 2111 of the application processor 2110 may perform serial communication with a DSI device 2151 of the display 2150 through DSI. For example, the DSI host 2111 may include a serializer SER and the DSI device 2151 may include a deserializer DES.

The electronic system 2000 may further include a radio-frequency (RF) chip 2160 that is capable of performing communication with the application processor 2110. A physical layer (PHY) 2113 of the application processor 2110 and a PHY 2161 of the RF chip 2160 may perform data transmission and reception data according to MIPI DigRF.

The application processor 2110 may further include a DigRF master 2114 that controls data transmission and reception according to the MIPI DigRF of the PHY 2113. The RF chip 2160 may include a DigRF slave 2162. The electronic system 2000 may further include a global positioning system (GPS) 2120, a storage 2170, a microphone 2180, a dynamic random access memory (DRAM) 2185, and a speaker 2190.

The electronic system 2000 may perform communication using a ultra-wideband (UWB) 2210, a wireless local area network (WLAN) 2220, a worldwide interoperability for microwave access (WiMAX) 2230, or the like. However, the configuration and interfaces of the electronic system 2000 are merely exemplary and are not limited thereto.

As described above, a comparing circuit and an image sensor may each include a current stabilization circuit, according to exemplary embodiments of the inventive concept. Accordingly, power fluctuation of the comparing circuit may be prevented.

While the inventive concept has been shown and described with reference to the exemplary embodiments thereof, it will be understood by those of ordinary skill in the art that various changes in form and details may be made thereto without departing from the spirit and scope of the present inventive concept as defined by the following claims.

What is claimed is:

1. A comparing circuit comprising:
   a first amplifier configured to perform a correlated double sampling (CDS) operation in response to a pixel signal and a ramp signal; and
   a second amplifier configured to amplify an output signal of the first amplifier,
   wherein the second amplifier comprises a current stabilization circuit configured to supply current to the second amplifier during the CDS operation irrespective of the output signal of the first amplifier,
   wherein the second amplifier comprises:
      a first transistor coupled between a power supply terminal and a first node;
      a second transistor coupled between a ground terminal and the first node;
      a third transistor coupled between a second node and the first node; and
      a charging device coupled between the second node and the ground terminal,
   wherein the first transistor is activated in response to the output signal of the first amplifier, and wherein the second transistor is activated in response to a voltage level of the second node.

2. The comparing circuit of claim 1, wherein the current stabilization circuit comprises a fourth transistor coupled between the power supply terminal and the first node.

3. The comparing circuit of claim 2, wherein the fourth transistor is activated in response to a current stabilization signal.

4. The comparing circuit of claim 2, wherein the fourth transistor is activated in response to the voltage level of the second node.

5. The comparing circuit of claim 2, wherein the charging device fixes the voltage level of the second node to a first voltage level when the third transistor is activated.

6. The comparing circuit of claim 1, wherein the first amplifier and the second amplifier share a ground pad.

7. An image sensor comprising:
a sensor array configured to convert light into an electrical signal to generate a pixel signal;
a ramp signal generator configured to generate a ramp signal; and
a comparing circuit configured to perform a correlated double sampling (CDS) operation in response to the pixel signal and the ramp signal,
wherein the comparing circuit comprises:
a first amplifier configured to perform the CDS operation; and
a second amplifier configured to amplify an output signal of the first amplifier, and
wherein the second amplifier includes a current stabilization circuit configured to supply current to the second amplifier during the CDS operation irrespective of the output signal of the first amplifier, and
wherein the current stabilization circuit includes a transistor couple between a power supply terminal and an output node of the second amplifier, and configured to be activated in response to a current stabilization signal.

8. The image sensor as set forth in claim 7, wherein the second amplifier comprises;
a first transistor coupled between the power supply terminal and a first node;
a second transistor coupled between a ground terminal and the first node;
a third transistor coupled between a second node and the first node; and
a charging device coupled between the second node and the ground terminal,
wherein the first transistor is activated in response to the output signal of the first amplifier, and
wherein the second transistor is activated in response to a voltage level of the second node.

9. The image sensor of claim 8, wherein the transistor included in the current stabilization circuit is a fourth transistor coupled between the power supply terminal and the first node.

10. A comparing circuit comprising:
a first amplifier configured to perform a correlated double sampling operation in response to a pixel signal and a ramp signal; and
a second amplifier, configured to amplify an output signal of the first amplifier,
wherein the second amplifier comprises:
a current stabilization circuit configured to supply current to the second amplifier during the correlated double sampling operation irrespective of the output signal of the first amplifier; and
a level shifter including a transistor connected to a level shifter control signal and a ground voltage, wherein the level shifter is configured to receive an output of the current stabilization circuit and adjust a voltage level of an output signal of the second amplifier.

* * * * *